US012603672B2

(12) United States Patent
 Sadri et al.

(10) Patent No.: US 12,603,672 B2
(45) Date of Patent: Apr. 14, 2026

(54) WIRELESS ROUTER SYSTEM AND METHOD FOR VEHICLES

(71) Applicant: Airgain, Inc., San Diego, CA (US)

(72) Inventors: Ali Sadri, San Diego, CA (US);
 Cheng-Yuan Chin, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 340 days.

(21) Appl. No.: 18/386,817

(22) Filed: Nov. 3, 2023

(65) Prior Publication Data

US 2024/0187030 A1 Jun. 6, 2024

Related U.S. Application Data

(60) Provisional application No. 63/430,142, filed on Dec. 5, 2022.

(51) Int. Cl.
 *H04B 1/3822* (2015.01)
 *H04W 84/12* (2009.01)
 *H04W 88/08* (2009.01)

(52) U.S. Cl.
 CPC ........... *H04B 1/3822* (2013.01); *H04W 84/12* (2013.01); *H04W 88/08* (2013.01)

(58) Field of Classification Search
 CPC .................................................. H04B 1/3822
 See application file for complete search history.

(56) References Cited

U.S. PATENT DOCUMENTS 9,020,657 B2 4/2015 Uhler
9,369,862 B2 6/2016 Karlsson 10,057,022 B2 8/2018 Yoganathan
10,609,711 B1 * 3/2020 Ma ........................ H04W 72/29
10,886,996 B1 * 1/2021 Robu ................... H04B 7/0834
2007/0037556 A1 2/2007 Andrews
  (Continued)

FOREIGN PATENT DOCUMENTS

WO WO 2022/094729 A1 5/2022

OTHER PUBLICATIONS

International Patent Application No. PCT/US2023/036848, filed Nov. 6, 2023; International Search Report /Written Opinion issued Feb. 21, 2024; 10 pages.

(Continued)

*Primary Examiner* — David Bilodeau
(74) *Attorney, Agent, or Firm* — Mueting Raasch Group

(57) ABSTRACT

A vehicle communication system comprises a first housing configured to be mounted inside the vehicle and a second housing configured to be mounted outside of the vehicle. A router is coupled to a first electronics module and an antenna selection module. The router, first electronics module, and antenna selection module are disposed in the first housing. A first Wi-Fi antenna is disposed in the first housing and coupled to the antenna selection module. A second Wi-Fi antenna is disposed in the second housing and coupled to the antenna selection module. A modem is disposed in the first housing or the second housing and coupled to the router. The antenna selection module comprises a switch operable by a user of the communication system for selecting between a plurality of Wi-Fi coverage states including an inside vehicle coverage state, an outside vehicle coverage state, and an inside and outside vehicle coverage state.

21 Claims, 8 Drawing Sheets

(56) References Cited

U.S. PATENT DOCUMENTS

| | | | |
|---|---|---|---|
| 2014/0049912 A1 | 2/2014 | Marshall | |
| 2017/0250738 A1* | 8/2017 | Kim ..................... | H04B 1/1009 |
| 2018/0098227 A1 | 4/2018 | Carnelli | |
| 2018/0213414 A1* | 7/2018 | Be .......................... | H04W 4/40 |
| 2019/0123774 A1* | 4/2019 | Zhan ...................... | H04B 3/548 |
| 2019/0334570 A1* | 10/2019 | Hwang ................... | H04B 1/00 |
| 2020/0212948 A1 | 7/2020 | Thill | |
| 2020/0238928 A1 | 7/2020 | Sandu | |
| 2020/0266850 A1* | 8/2020 | Eaton ................... | H04W 48/16 |
| 2020/0280827 A1 | 9/2020 | Fechtel | |
| 2021/0152209 A1* | 5/2021 | Baek ................... | H04B 1/3822 |
| 2022/0300721 A1 | 9/2022 | Harney | |

OTHER PUBLICATIONS

Sierra Wireless, XR90 Data Sheet, AirLine XR90, sierrawireless.
com, 4 pages.
Verizon, Cradlepoint device, R2155-5GB (child), 2022, 3 pages.
Verizon, Cradlepoint device, R2105-5GB, 2022, 3 pages.

* cited by examiner

WIFI - INSIDE

WIFI - OUTSIDE

WIRELESS ROUTER SYSTEM AND METHOD FOR VEHICLES

CROSS-REFERENCE TO RELATED APPLICATION

This application claims the benefit of U.S. Provisional Patent Application No. 63/430,142, filed Dec. 5, 2022, which is incorporated herein by reference in its entirety.

SUMMARY

Some embodiments are directed to a communication system for a vehicle comprising a first housing configured to be mounted inside the vehicle and a second housing configured to be mounted outside of the vehicle. A router is coupled to a first electronics module and an antenna selection module. The router, first electronics module, and antenna selection module are disposed in the first housing. A first Wi-Fi antenna is disposed in the first housing and coupled to the antenna selection module. A second Wi-Fi antenna is disposed in the second housing and coupled to the antenna selection module. A modem is disposed in the first housing or the second housing and coupled to the router. The antenna selection module comprises a switch operable by a user of the communication system for selecting between a plurality of Wi-Fi coverage states including an inside vehicle coverage state, an outside vehicle coverage state, and an inside and outside vehicle coverage state.

Some embodiments are directed to a communication system for a vehicle comprising a first housing configured to be mounted to a ceiling of the vehicle and a second housing configured to be mounted to a roof of the vehicle, wherein the first and second housings are mechanically connected via a coupling arrangement passing through the roof and ceiling. A router is coupled to a first electronics module and an antenna selection module. The router, first electronics module, and antenna selection module are disposed in the first housing. A first Wi-Fi antenna is disposed in the first housing and coupled to the antenna selection module. A second Wi-Fi antenna is disposed in the second housing and coupled to the antenna selection module. A modem is disposed in the first housing or the second housing and coupled to the router. The antenna selection module comprises a switch operable by a user of the communication system. The switch comprises a tri-state switch arrangement configured to selectively couple the router to the first Wi-Fi antenna, the second Wi-Fi antenna, or both the first and second Wi-Fi antennas.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figures 1A, 1B:
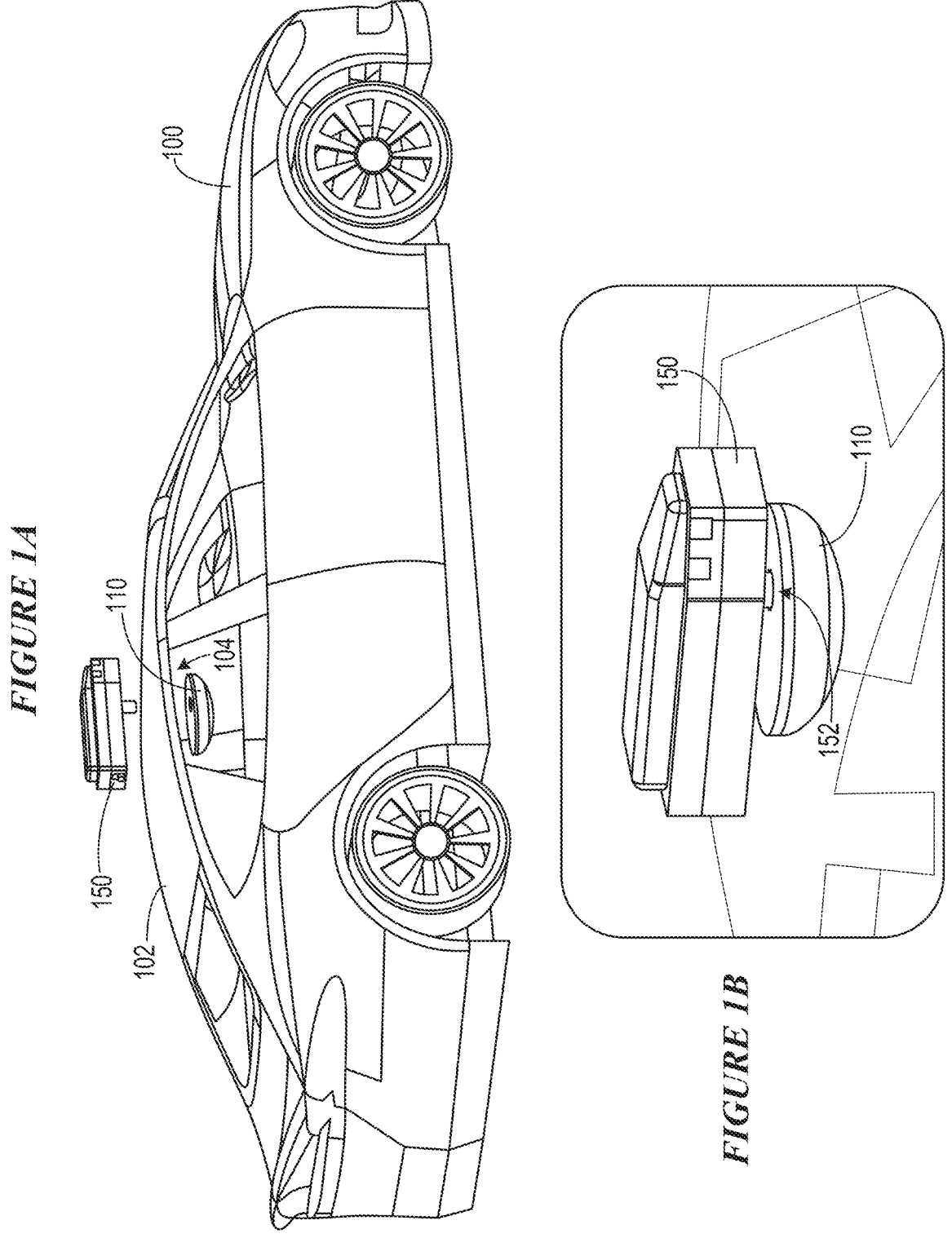
FIG. 1A illustrates a communication system for a vehicle in accordance with various embodiments.
FIG. 1B illustrates a communication system for a vehicle in accordance with various embodiments.

Embodiments of the disclosure are directed to a communication system for a vehicle that provides differing Wi-Fi coverage states for a variety of different scenarios. A user of the communication system can select different Wi-Fi coverage states depending on need or desired coverage. For example, in one scenario, the user may select Wi-Fi coverage for the interior of the vehicle. In another scenario, the user may select Wi-Fi coverage for the exterior of the vehicle. In a further scenario, the user may select Wi-Fi coverage for both the interior and the exterior of the vehicle.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A communication system for a vehicle comprises a first housing configured to be mounted inside the vehicle. A router is coupled to a first electronics module and an antenna selection module. The router, first electronics module, and antenna selection module are disposed in the first housing. A first Wi-Fi antenna is disposed in the first housing and coupled to the antenna selection module. A second housing is configured to be mounted outside of the vehicle, and a second Wi-Fi antenna is disposed in the second housing and coupled to the antenna selection module. A modem is disposed in the first housing or the second housing and coupled to the router. The antenna selection module comprises a switch operable by a user of the communication system for selecting between a plurality of Wi-Fi coverage states including an inside vehicle coverage state, an outside vehicle coverage state, and an inside and outside vehicle coverage state.

Example Ex2. The system according to Ex1, wherein the switch comprises a physical switch.

Example Ex3. The system according to Ex1, wherein the switch comprises a soft switch.

Example Ex4. The system according to one or more of Ex1 to Ex3, wherein the switch comprises a tri-state switch arrangement configured to selectively couple the router to the first Wi-Fi antenna, the second Wi-Fi antenna, or both the first and second Wi-Fi antennas.

Example Ex5. The system according to Ex4, wherein the tri-state switch arrangement comprises a single pole-triple throw (SP3T) switch having a pole coupled to the router, a first single pole-double throw (SPDT) switch having a pole coupled to the first Wi-Fi antenna, a second SPDT switch having a pole coupled to the second Wi-Fi antenna, and a power divider selectively couplable between the SP3T switch and the first and second SPDT switches.

Example Ex6. The system of according to one or more of Ex1 to Ex5, wherein the modem is disposed in the second housing, and a second electronics module is disposed in the second housing and coupled to the modem and the first electronics module.

Example Ex7. The system according to one or more of Ex1 to Ex5, wherein the modem is disposed in the first housing and coupled to the first electronics module.

Example Ex8. The system according to one or more of Ex1 to Ex7, wherein the second housing is configured to be mounted to a roof of the vehicle, the first housing is configured to be mounted to a ceiling of the vehicle, and the first and second housings are mechanically connected via a coupling arrangement passing through the roof and ceiling.

Example Ex9. The system according to Ex8, wherein the coupling arrangement comprises a snap-on fastening arrangement.

Example Ex10. The system according to one or more of Ex1 to Ex7, wherein the first housing is configured to be mounted inside the vehicle and away from a ceiling of the vehicle, and the second Wi-Fi antenna is coupled to the antenna selection module by a cable passing through a hole in a roof of the vehicle and the ceiling.

Example Ex11. The system according to Ex10, wherein a second electronics module is disposed in the second housing, and the second electronics module is coupled to the first electronics module by a cable harness passing through a hole in the roof and the ceiling.

Example Ex12. The system according to one or more of Ex1 to Ex11, wherein one or both of the first electronics module disposed in the first housing and a second electronics module disposed in the second housing comprises one or more sensors.

Example Ex13. The system according to Ex12, wherein the one or more sensors comprise, are not limited to, one or more of an accelerometer, a gyroscope, a temperature sensor, a camera, a radar, and a lidar.

Example Ex14. The system according to one or more of Ex1 to Ex13, comprising a connector interface configured to provide one or more of power, data, and RF connectivity between the first housing and the second housing.

Example Ex15. The system o according to one or more of Ex1 to Ex14, wherein the router comprises a heatsink.

Example Ex16. A communication system for a vehicle comprises a first housing configured to be mounted to a ceiling of the vehicle. A router is coupled to a first electronics module and an antenna selection module. The router, first electronics module, and antenna selection module are disposed in the first housing. A first Wi-Fi antenna is disposed in the first housing and coupled to the antenna selection module. A second housing is configured to be mounted to a roof of the vehicle, wherein the first and second housings are mechanically connected via a coupling arrangement passing through the roof and ceiling. A second Wi-Fi antenna is disposed in the second housing and coupled to the antenna selection module. A modem is disposed in the first housing or the second housing and coupled to the router. The antenna selection module comprises a switch operable by a user of the communication system, the switch comprising a tri-state switch arrangement configured to selectively couple the router to the first Wi-Fi antenna, the second Wi-Fi antenna, or both the first and second Wi-Fi antennas.

Example Ex17. The system according to Ex16, wherein the coupling arrangement comprises a snap-on fastening arrangement.

Example Ex18. The system according to Ex16 or Ex17, wherein the switch comprises a physical switch.

Example Ex19. The system according to Ex16 or Ex17, wherein the switch comprises a soft switch.

Example Ex20. The system according to one or more of Ex16 to Ex19, wherein the tri-state switch arrangement comprises a single pole-triple throw (SP3T) switch having a pole coupled to the router, a first single pole-double throw (SPDT) switch having a pole coupled to the first Wi-Fi antenna, a second SPDT switch having a pole coupled to the second Wi-Fi antenna, and a power divider selectively couplable between the SP3T switch and the first and second SPDT switches.

Example Ex21. The system according to one or more of Ex16 to Ex20, wherein the modem is disposed in the second housing, and a second electronics module is disposed in the second housing and coupled to the modem and the first electronics module.

Example Ex22. The system according to one or more of Ex16 to Ex20, wherein the modem is disposed in the first housing and coupled to the first electronics module.

FIG. 1A illustrates a vehicle equipped with a communication system in accordance with some embodiments. The communication system shown in FIG. 1A includes a first housing 110 configured to be mounted inside the vehicle 100. For example, and as indicated in FIG. 1A, the first housing 110 can be configured for mounting to a ceiling 104 of the vehicle 100. The communication system also includes a second housing 150 configured to be mounted outside of the vehicle 100. For example, and as indicated in Figure JA, the second housing 150 can be configured to be mounted to a roof 102 of the vehicle 100. The first and second housings 110, 150 can be mechanically connected via a coupling arrangement 152 that passes through the roof 102 and the ceiling 104, as is shown in the FIG. 1B. According to other embodiments, and as discussed below, the first housing 110 can be positioned away from the ceiling 104 and situated at a location within the vehicle remote from the second housing 150 (e.g., glove compartment, floor console, trunk, pillar).

Among other components, a router and a first Wi-Fi antenna are disposed in the first housing 110 according to various embodiments. At least a second Wi-Fi antenna is disposed in the second housing 150. A modem can be disposed in the first housing 110 or the second housing 150. A switch is coupled to the router which allows the user of the communication system to configure the Wi-Fi coverage of the vehicle 100 for different scenarios. More particularly, and in accordance with some embodiments, the switch is operable by the user to select between three different Wi-Fi coverage states including an inside vehicle coverage state, an outside vehicle coverage state, and an inside and outside vehicle coverage state.

Figure 2:
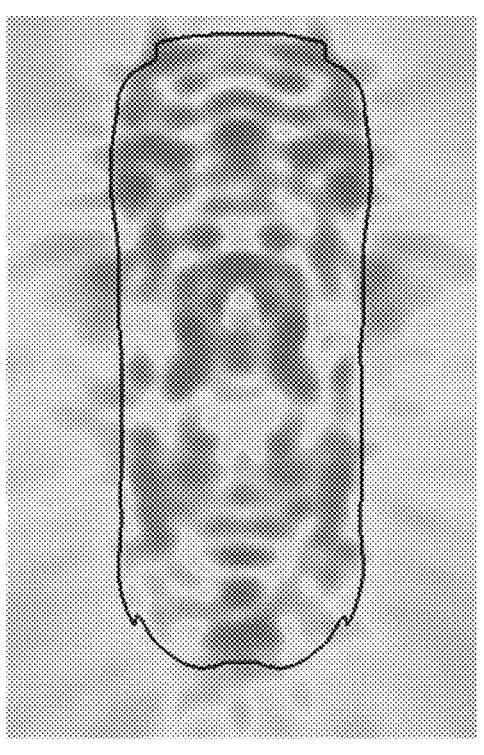
FIG. 2 illustrates the field distribution associated with an inside vehicle coverage state provided by a communication system in accordance with various embodiments.
Figure 3:
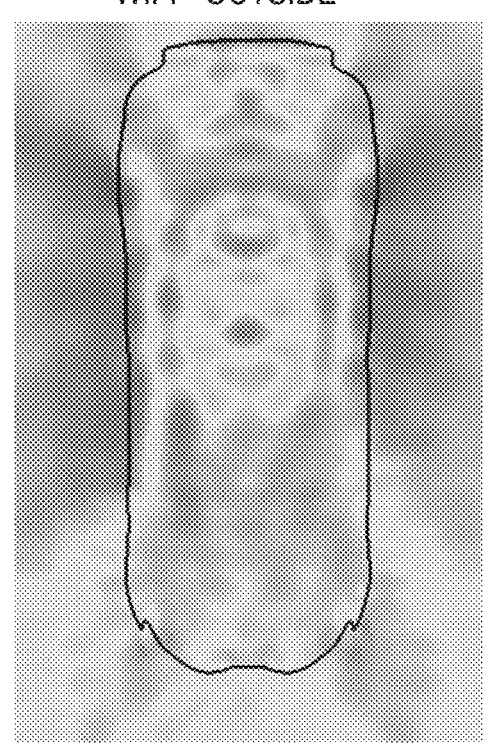
FIG. 3 illustrates the field distribution associated with an outside vehicle coverage state provided by a communication system in accordance with various embodiments.
Figure 4:
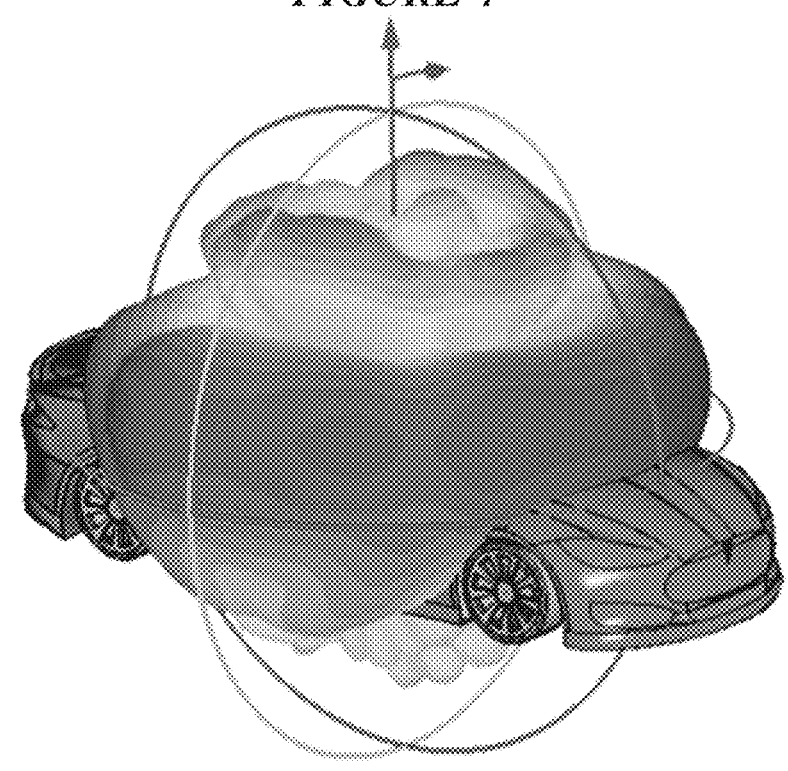
FIG. 4 shows a radiation pattern associated with the outside vehicle coverage state provided by a communication system in accordance with various embodiments.

For example, the inside vehicle coverage state can be selected by the user during a family driving vacation to provide passengers with Wi-Fi coverage inside the vehicle via the first Wi-Fi antenna disposed in the first housing 110. FIG. 2 illustrates the field distribution associated with the inside vehicle coverage state. First responders can select the outside vehicle coverage state to create an external Wi-Fi bubble about the exterior of the vehicle via the second Wi-Fi antenna disposed in the second housing 150. FIG. 3 illustrates the field distribution associated with the outside vehicle coverage state. FIG. 4 shows the radiation pattern (e.g., external Wi-Fi bubble) associated with the outside vehicle coverage state. Campers can select the inside and outside coverage state to share Wi-Fi coverage with people inside and outside of the vehicle (e.g., a motor home). The field distribution associated with the inside and outside vehicle coverage state would be a combination of the field distributions shown in FIGS. 2 and 3.

Figure 5A:
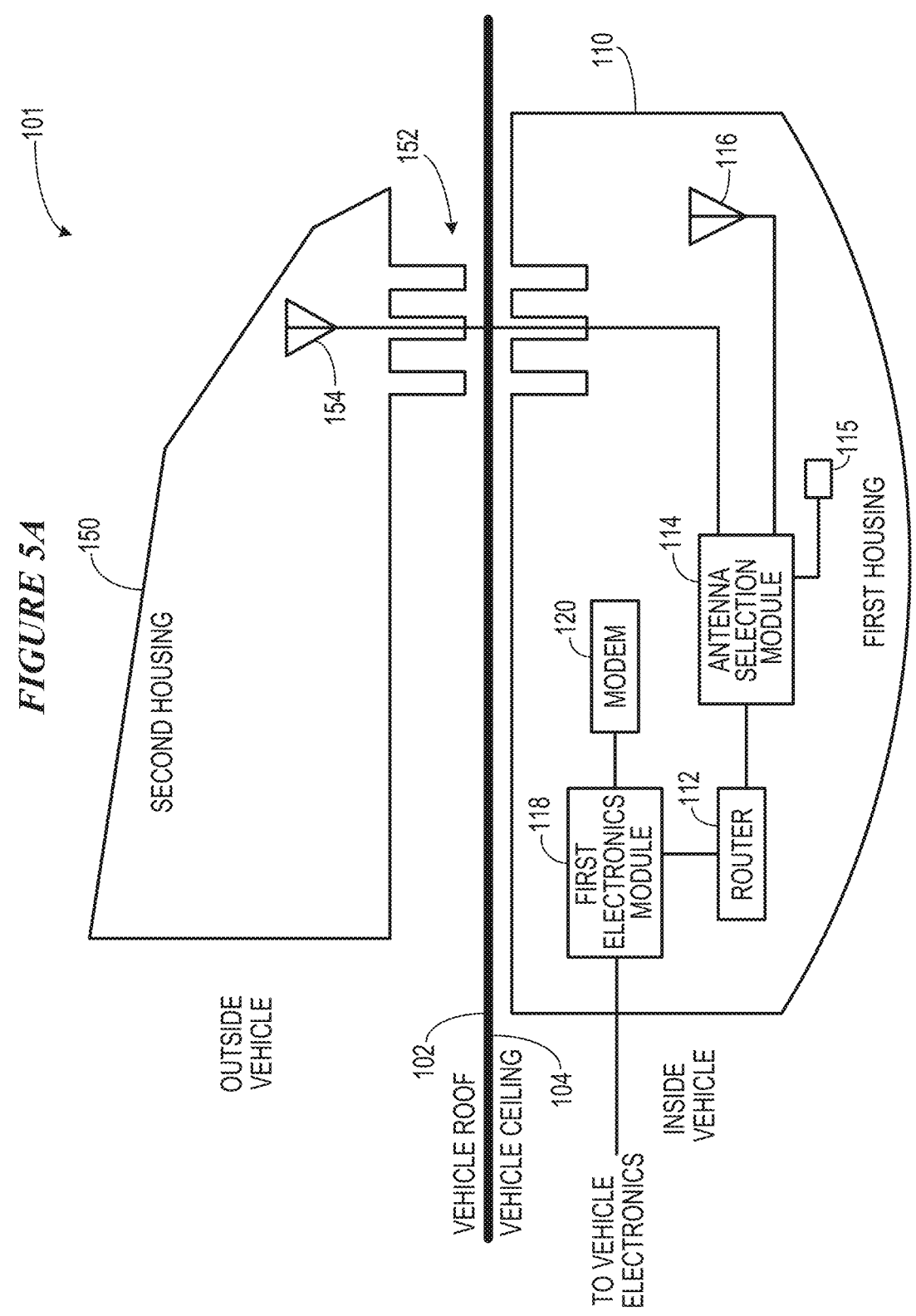
FIG. 5A illustrates a communication system in accordance with some embodiments.

FIG. 5A illustrates a communication system 101 in accordance with some embodiments. The communication system 101 includes a first housing 110 configured to be mounted inside the vehicle 100 shown in FIG. 1A. In the embodiment shown in FIG. 5A, the first housing 110 is configured to be mounted to a ceiling 104 of the vehicle 100. The communication system 101 also includes a second housing 150 configured to be mounted outside of the vehicle 100. In the embodiment shown in FIG. 5A, the second housing 150 is configured to be mounted to a roof 102 of the vehicle 100.

The first housing 110 shown in FIG. 5A includes a number of components including a router 112 coupled to a first electronics module 118 and an antenna selection module 114. At least a first Wi-Fi antenna 116 is disposed in the first housing 110 and coupled to the antenna selection module 114. The first electronics module 118 can include a multi-layer motherboard populated with a number of components including passive and active components, surface mounted components, power modules, one or more controllers and/or processors, connectors, and ports, among others. A modem 120 is disposed in the first housing 110 and coupled to the first electronics module 118. In some implementations, the modem 120 is a component mounted to the motherboard of the first electronics module 118. In other implementations, the modem 120 is a separate unit which is coupled to the first electronics module 118. In the embodiment shown in FIG. 5A, the router 112 and the modem 120 are situated in the same housing (e.g., the first housing 110). The first electronics module 118 is configured to couple to vehicle electronics which provides power to the communication system 101 and facilitates the transfer of data between the vehicle electronics and the communication system 101.

At least a second Wi-Fi antenna 154 is disposed in the second housing 150. It is noted that one or more antennas in addition to the second Wi-Fi antenna 154 can be housed in the second housing 150 (e.g., one or more of which can be coupled to the modem 120). Such additional antennas can include one or more of a cellular antenna(s) (e.g., 4G, 5G, 6G, FR1, FR2), a GPS antenna, and a satellite communications antenna (e.g., satcom antenna).

The first and second housings 110, 150 are mechanically connected via a coupling arrangement 152 passing through the roof 102 and the ceiling 104. In some implementations, the coupling arrangement 152 comprises a snap-on fastening arrangement or an interference fit arrangement (e.g., a press fit or friction fit arrangement). For example, and as shown in FIG. 5A, the coupling arrangement 152 can include a number of corresponding male and female members that can be forced together (through the roof 102 and ceiling 104) to facilitate a snap-on or interference fit connection. Other coupling arrangements are contemplated, including arrangements that include bolts, screws, and/or other fasteners. The coupling arrangement 152 can include SMP connectors (e.g., snap-on or push-on SMP connectors) for coupling the second Wi-Fi antenna 154 from the second housing 150 to the first housing 110. In other coupling arrangements, SMA connectors can be used for coupling the second Wi-Fi antenna 154 from the second housing 150 to the first housing 110.

The router 112 can be selectively coupled to the first Wi-Fi antenna 116 and the second Wi-Fi antenna 154 via the antenna selection module 114. As discussed in detail below, the antenna selection module 114 includes a switch 115 configured to selectively couple the router 112 to the first Wi-Fi antenna 116, the second Wi-Fi antenna 154, or to both the first and second Wi-Fi antennas 116, 154. The switch 115 can be, for example, a tri-state switch. In some implementations, the switch 115 can be a physical switch of the antenna selection module 114. In other implementations, the switch 115 can be a soft switch that controls a physical switch of the antenna selection module 114. For example, three different Wi-Fi coverage states can be selected via a soft switch (e.g., screen buttons) provided by an app running on a smartphone. The app can be implemented to control selected functions of the communication system 101 via program instructions executed by the processor of the smartphone. The soft switch controls a physical switch of the antenna selection module 114 for selecting between the three different Wi-Fi coverage states.

Figure 5B:
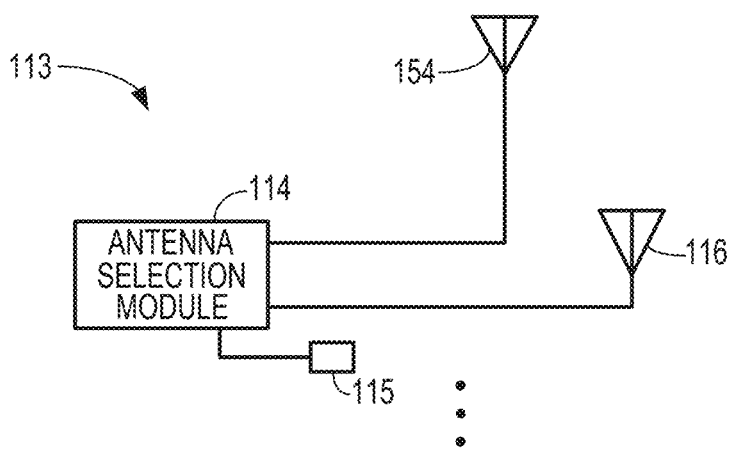
FIG. 5B illustrates an embodiment of FIG. 5A which includes multiple antenna selection subsystems in accordance with some embodiments.
Figure 5B:
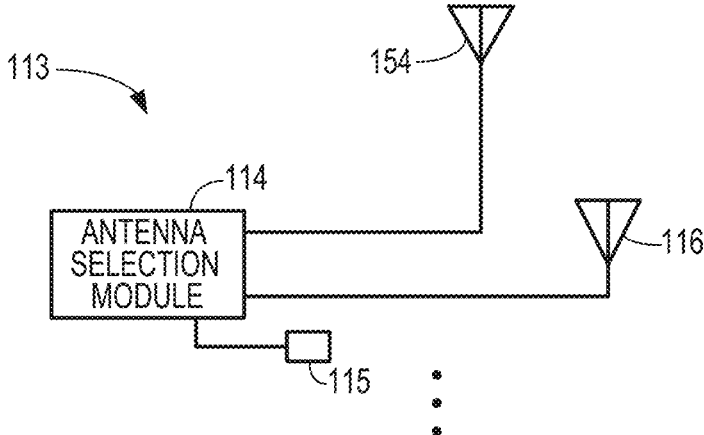
Figure 5B:
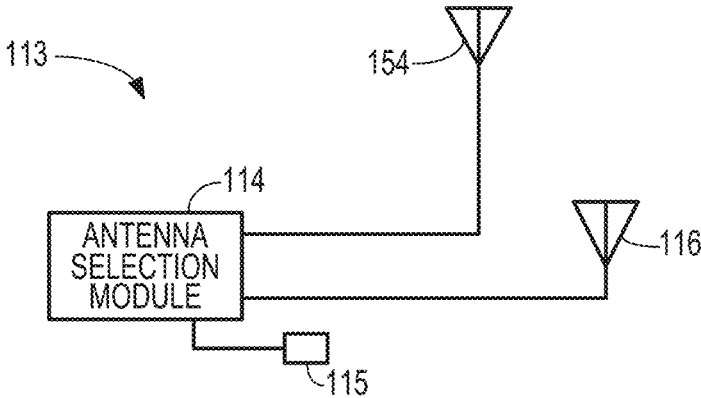

FIG. 5B illustrates an embodiment of FIG. 5A which includes multiple antenna selection subsystems 113. Each of the antenna selection subsystems 113 includes a first Wi-Fi antenna 116, a second Wi-Fi antenna 154, and an antenna selection module 114 as described above. Accordingly, the communication system 101 shown in FIG. 5A can include a plurality of first Wi-Fi antennas 116, a plurality of second Wi-Fi antennas 154, and a plurality of antenna selection modules 114. The antenna selection modules 114 can operate in the same state (e.g., an inside vehicle Wi-Fi coverage state, an outside vehicle Wi-Fi coverage state) or in different states. For example, one or more antenna selection modules 114 can operate to provide an inside vehicle Wi-Fi coverage state, while one or more other antenna selection modules 114 can operate to provide an outside vehicle Wi-Fi coverage state.

By way of further example, Wi-Fi 6 can support up to eight antennas (e.g., up to 8×8 MIMO antennas). In this illustrative example, the communication system 101 can include up to eight antenna selections subsystems 113 (e.g., up to eight first Wi-Fi antennas 116, second Wi-Fi antennas 154, and antenna selection modules 114). As an example, four antenna selection modules 114 can operate to provide an inside vehicle Wi-Fi coverage state, while four other antenna selection modules 114 can operate to provide an outside vehicle Wi-Fi coverage state. It is understood that the number of antenna selections subsystems 113 can increase beyond eight subsystems in the event that more antennas are supported by future versions of Wi-Fi standards.

Figure 6:
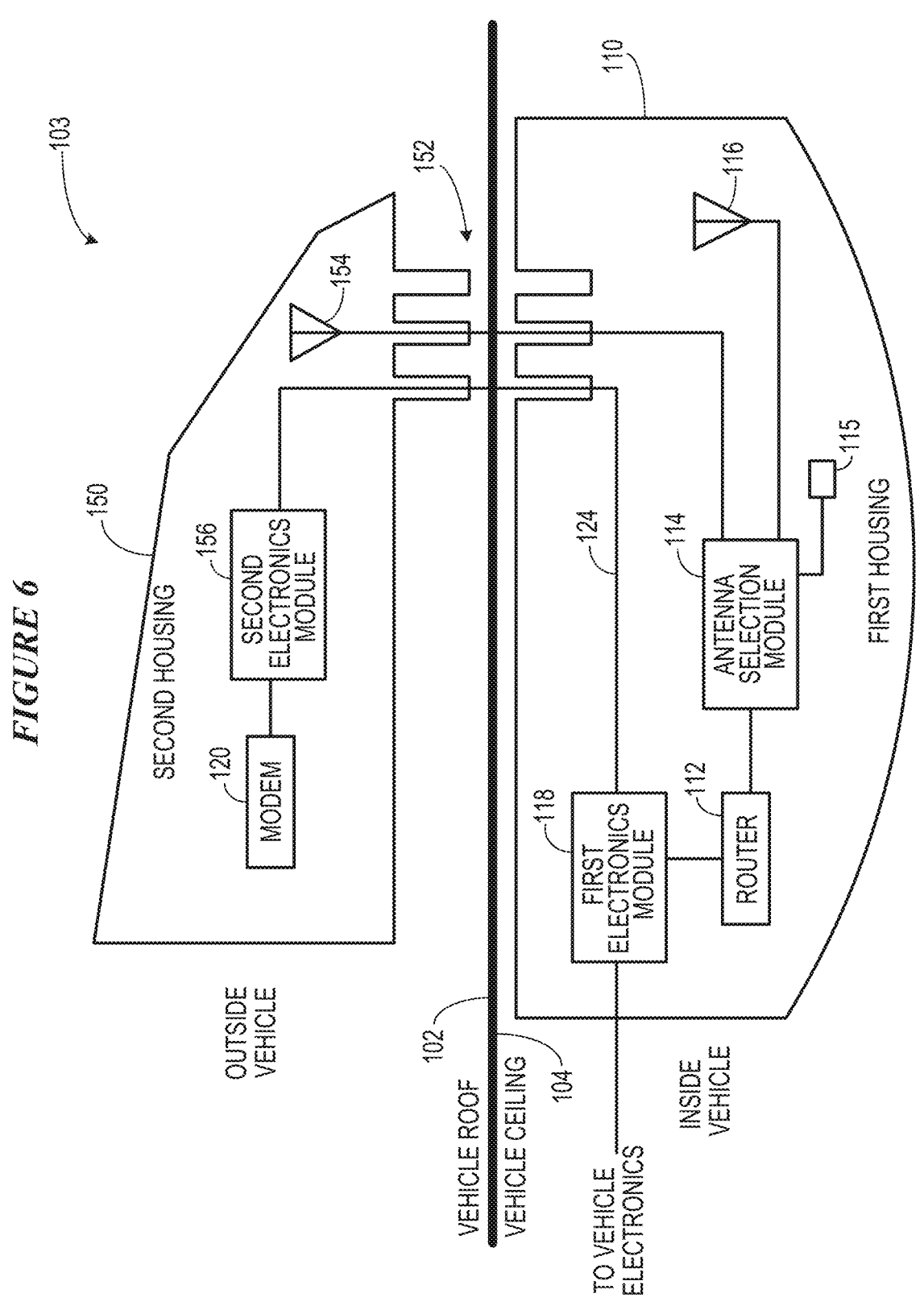
FIG. 6 illustrates a communication system in accordance with other embodiments.

FIG. 6 illustrates a communication system 103 in accordance with some embodiments. The communication system 103 includes a first housing 110 configured to be mounted inside the vehicle 100, such as to a ceiling 104 of the vehicle 100. The communication system 103 also includes a second housing 150 configured to be mounted outside of the vehicle 100, such as to a roof 102 of the vehicle 100.

The first housing 110 shown in FIG. 6 includes a number of components including a router 112 coupled to a first electronics module 118 and an antenna selection module 114. A first Wi-Fi antenna 116 is disposed in the first housing

110 and coupled to the antenna selection module 114. The first electronics module 118 includes various components as previously described.

In the embodiment shown in FIG. 6, a modem 120 is coupled to a second electronics module 156. The modem 120, second electronics module 156, and second Wi-Fi antenna 154 are disposed in the second housing 150. As is shown in FIG. 6, the router 112 and the modem 120 are situated in different housings. The second electronics module 156 can include some or all of the components associated with the first electronics module 118. It is noted that one or more antennas in addition to the second Wi-Fi antenna 154 can be housed in the second housing 150 (e.g., one or more of which can be coupled to the modem 120). Such additional antennas can include one or more of a cellular antenna(s), a GPS antenna, and a satellite communications antenna.

The first and second housings 110, 150 are mechanically connected via a coupling arrangement 152 passing through the roof 102 and the ceiling 104 as previously described. The communication system 103 can comprise a connector interface configured to provide one or more of power, data, and RF connectivity between the first housing 110 and the second housing 150. The second electronics module 156 is coupled to the first electronics module 118 via a cable harness 124 and the coupling arrangement 152. The cable harness 124 includes conductors to carry both power and data. In some implementations, the coupling arrangement 152 comprises a snap-on fastening arrangement or an interference fit arrangement (e.g., a press fit or friction fit arrangement) as previously described. Alternatively, or in addition, the coupling arrangement 152 can include bolts, screws or other fasteners. The coupling arrangement 152 can include SMP connectors (e.g., snap-on or push-on SMP connectors) for coupling the second Wi-Fi antenna 154 from the second housing 150 to the first housing 110. In other coupling arrangements, SMA connectors can be used for coupling the second Wi-Fi antenna 154 from the second housing 150 to the first housing 110. The cable harness 124 can include snap-on or push-on power and data connectors at the coupling arrangement 152. Suitable power and data connectors include those available from Bourns® (e.g., modular contacts).

As previously described, the router 112 can be selectively coupled to the first Wi-Fi antenna 116 and the second Wi-Fi antenna 154 via the antenna selection module 114. The antenna selection module 114 includes a switch 115 configured to selectively couple the router 112 to the first Wi-Fi antenna 116, the second Wi-Fi antenna 154, or to both the first and second Wi-Fi antennas 116, 154, details of which are provided below. The switch 115 can be a physical switch or a soft switch that controls a physical switch.

In some embodiments, the communication system 103 shown in FIG. 6 can include multiple antenna selection subsystems 113 of the type shown in FIG. 5B. As discussed previously, each of the antenna selection subsystems 113 includes a first Wi-Fi antenna 116, a second Wi-Fi antenna 154, and an antenna selection module 114. Accordingly, the communication system 103 can include a plurality of first Wi-Fi antennas 116, a plurality of second Wi-Fi antennas 154, and a plurality of antenna selection modules 114. The antenna selection modules 114 can operate in the same state (e.g., an inside vehicle Wi-Fi coverage state, an outside vehicle Wi-Fi coverage state) or in different states. For example, one or more antenna selection modules 114 can operate to provide an inside vehicle Wi-Fi coverage state, while one or more other antenna selection modules 114 can operate to provide an outside vehicle Wi-Fi coverage state.

Figure 7:
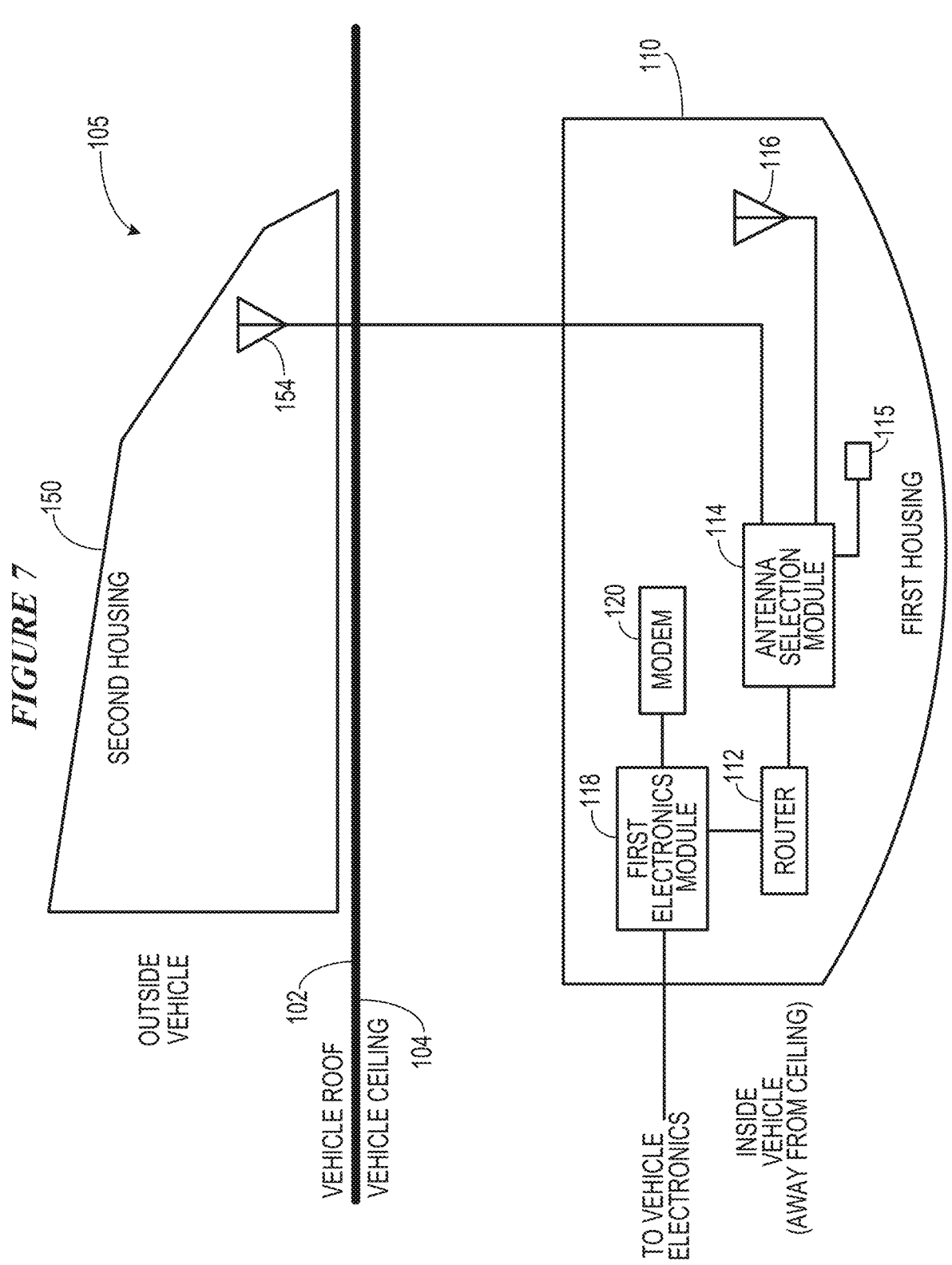
FIG. 7 illustrates a communication system in accordance with further embodiments.

FIG. 7 illustrates a communication system 105 in accordance with some embodiments. The communication system 105 includes a first housing 110 configured to be mounted anywhere inside the vehicle 100. The communication system 105 also includes a second housing 150 configured to be mounted outside of the vehicle 100, such as to a roof 102 of the vehicle 100. The communication system 105 shown in FIG. 7 is similar to that shown in FIG. 5A, but differs in terms of the mounting location of the first housing 110 within the vehicle 100.

The first housing 110 shown in FIG. 7 includes a number of components including a router 112 coupled to a first electronics module 118 and an antenna selection module 114. A first Wi-Fi antenna 116 is disposed in the first housing 110 and coupled to the antenna selection module 114. A modem 120 is disposed in the first housing 110 and coupled to the first electronics module 118. The components of the first housing 110 can be the same as those described above with reference to FIG. 5A.

At least a second Wi-Fi antenna 154 is disposed in the second housing 150. As previously discussed, one or more antennas in addition to the second Wi-Fi antenna 154 can be housed in the second housing 150 (e.g., one or more of which can be coupled to the modem 120). The second Wi-Fi antenna 154 can be connected to the antenna selection module 114 via an antenna cable extending from the second housing 150 the first housing 110 via the vehicle roof 102/vehicle ceiling 104. In the embodiment shown in FIG. 7, the first housing 110 can be located anywhere within the vehicle 100, such as the glove compartment, floor console, trunk or pillar.

In some embodiments, the communication system 105 shown in FIG. 7 can include multiple antenna selection subsystems 113 of the type shown in FIG. 5B. As discussed previously, each of the antenna selection subsystems 113 includes a first Wi-Fi antenna 116, a second Wi-Fi antenna 154, and an antenna selection module 114. Accordingly, the communication system 105 can include a plurality of first Wi-Fi antennas 116, a plurality of second Wi-Fi antennas 154, and a plurality of antenna selection modules 114. The antenna selection modules 114 can operate in the same state (e.g., an inside vehicle Wi-Fi coverage state, an outside vehicle Wi-Fi coverage state) or in different states. For example, one or more antenna selection modules 114 can operate to provide an inside vehicle Wi-Fi coverage state, while one or more other antenna selection modules 114 can operate to provide an outside vehicle Wi-Fi coverage state.

Figure 8:
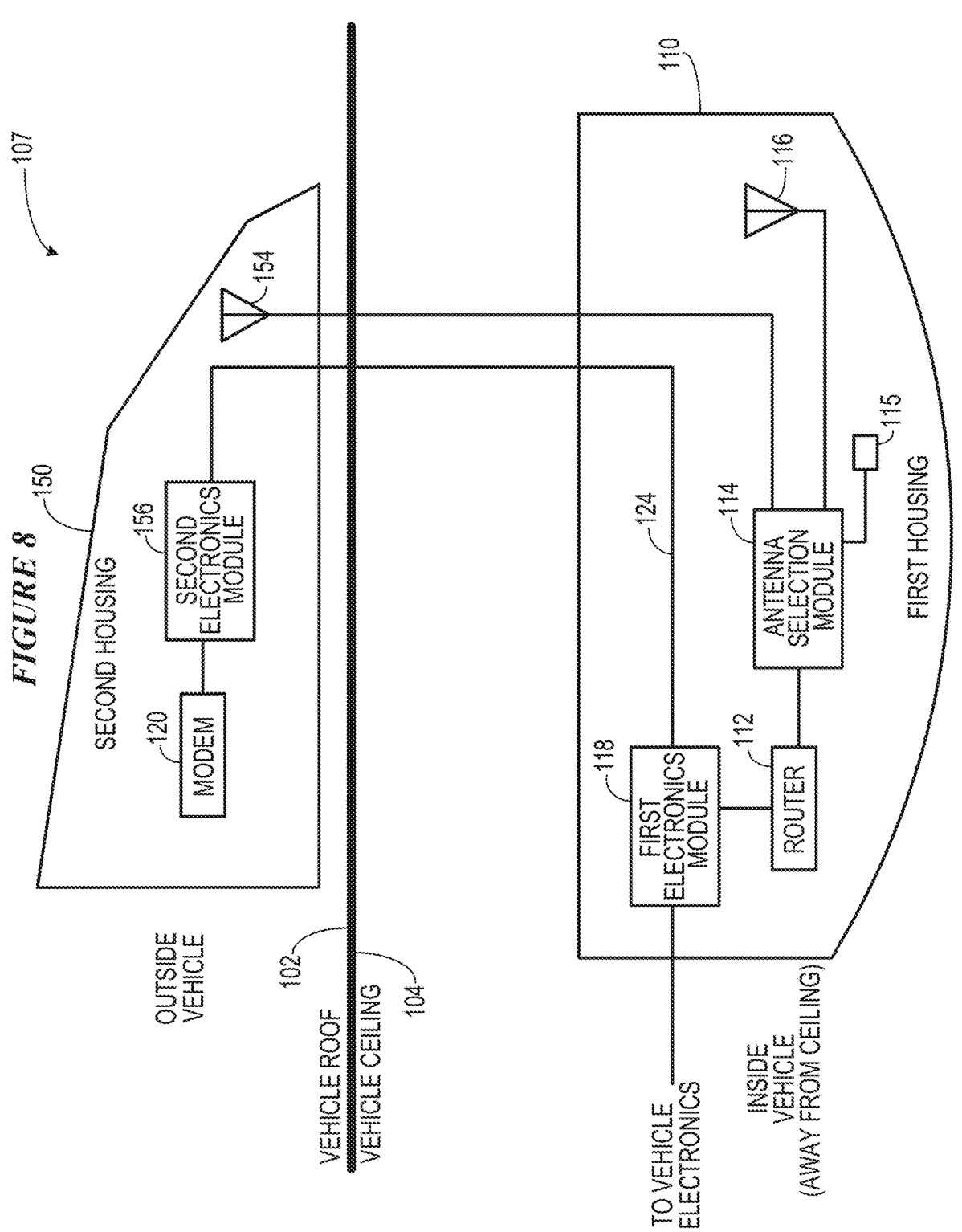
FIG. 8 illustrates a communication system in accordance with some embodiments.

FIG. 8 illustrates a communication system 107 in accordance with some embodiments. The communication system 107 includes a first housing 110 configured to be mounted anywhere inside the vehicle 100. The communication system 107 also includes a second housing 150 configured to be mounted outside of the vehicle 100, such as to a roof 102 of the vehicle 100. The communication system 107 shown in FIG. 8 is similar to that shown in FIG. 6, but differs in terms of the mounting location of the first housing 110 within the vehicle 100.

The first housing 110 shown in FIG. 8 includes a number of components including a router 112 coupled to a first electronics module 118 and an antenna selection module 114. A first Wi-Fi antenna 116 is disposed in the first housing 110 and coupled to the antenna selection module 114. The second housing 150 is configured to house a modem 120 and a second electronics module 118 coupled to the modem 120. A second Wi-Fi antenna 154 is disposed in the second housing 150. As previously discussed, one or more antennas in addition to the second Wi-Fi antenna 154 can be housed in the second housing 150 (e.g., one or more of which can be coupled to the modem 120). The components of the first and second housings 110, 150 can be the same as those described above with reference to FIG. 6. For example, the communication system 107 can comprise a connector interface configured to provide one or more of power, data, and RF connectivity between the first housing 110 and the second housing 150.

The second Wi-Fi antenna 154 can be connected to the antenna selection module 114 by an antenna cable extending from the second housing 152 to the first housing 110 via the vehicle roof 102/vehicle ceiling 104. The second electronics module 156 is coupled to the first electronics module 118 via a cable harness 124 via the vehicle roof 102/vehicle ceiling 104. The cable harness 124 includes conductors to carry both power and data. In the embodiment shown in FIG. 8, the first housing 110 can be located anywhere within the vehicle 100, such as the glove compartment, floor console, trunk or pillar.

In some embodiments, the communication system 107 shown in FIG. 8 can include multiple antenna selection subsystems 113 of the type shown in FIG. 5B. As discussed previously, each of the antenna selection subsystems 113 includes a first Wi-Fi antenna 116, a second Wi-Fi antenna 154, and an antenna selection module 114. Accordingly, the communication system 107 can include a plurality of first Wi-Fi antennas 116, a plurality of second Wi-Fi antennas 154, and a plurality of antenna selection modules 114. The antenna selection modules 114 can operate in the same state (e.g., an inside vehicle Wi-Fi coverage state, an outside vehicle Wi-Fi coverage state) or in different states. For example, one or more antenna selection modules 114 can operate to provide an inside vehicle Wi-Fi coverage state, while one or more other antenna selection modules 114 can operate to provide an outside vehicle Wi-Fi coverage state.

Figure 9:
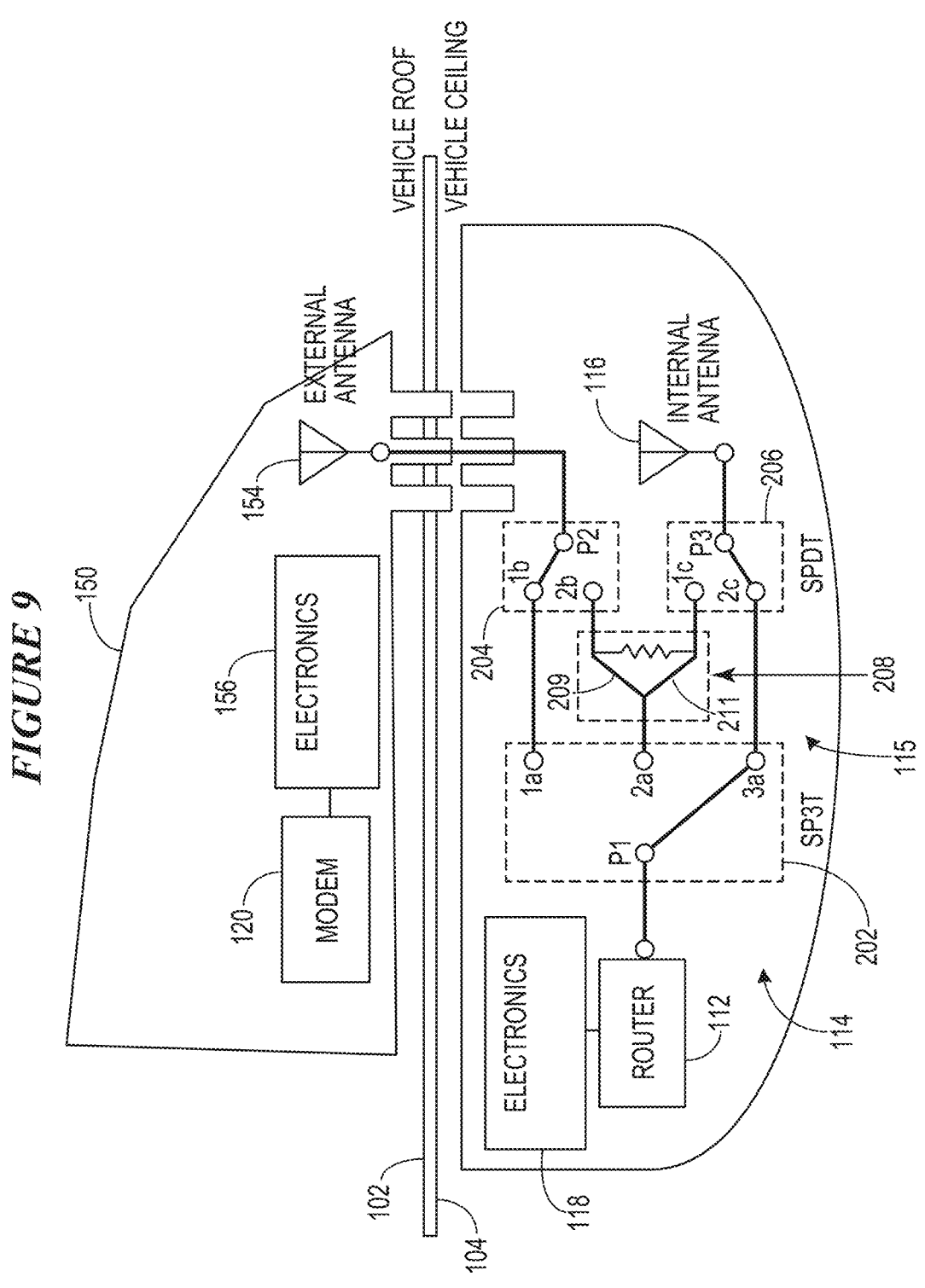
FIG. 9 illustrates details of a tri-state switch for selecting different Wi-Fi coverage states in accordance with various embodiments.

FIG. 9 illustrates details of a tri-state switch 115 in accordance with various embodiments. It is understood that the tri-state switch 115 shown in FIG. 9 can be incorporated in any of the embodiments disclosed herein. The switch 115 shown in FIG. 9 includes a single-pole-triple-throw (SP3T) switch 202 having a pole P1 coupled to the router 112. The SP3T switch 202 includes a first contact 1a, a second contact 2a, and a third contact 3a. Contact 1a is coupled to a first single-pole-double-throw (SPDT) switch 204 which includes a pole P2, a first contact 1b, and a second contact 2b. The pole P2 is coupled to the second antenna 154 disposed in the second housing 150 mounted to the roof 102 of the vehicle 100.

Contact 3a of SP3T switch 202 is coupled to a second single-pole-double-throw (SPDT) switch 206 which includes a pole P3, a first contact 1c, and a second contact 2c. The pole P3 is coupled to the first antenna 116 disposed in the first housing 150.

Contact 2a of SP3T switch 202 is coupled to a power divider 208 which divides power between a path 209 and a path 211. Power can be divided by the power divider 208 evenly or unevenly. Contact 2b of SPDT switch 204 is coupled to the first path 209 of the power divider 208. Contact 1c of SPDT switch 206 is coupled to the second path 211 of the power divider 208. It is noted that the power divider 208 may be needed in applications in which the power of the router 112 is regulated to a maximum output power. It is also noted that the router 112 can generate significant heat and can include, or be mounted to, a heatsink to dissipate heat.

In the embodiment shown in FIG. 9, the switch 115 is a tri-state switch arrangement configured to selectively couple the router 112 to either the first Wi-Fi antenna 116, the second Wi-Fi antenna 154, or both the first and second Wi-Fi antennas 116, 154. Table 1 below shows three different vehicle coverage states for providing Wi-Fi coverage in and about a vehicle. Table 1 shows the position of each of the switches SP3T 202, SPDT 204, SPDT 206 needed to achieve each of the vehicle coverage states.

TABLE 1

| | Coverage State 1 (inside vehicle) | Coverage State 2 (outside vehicle) | Coverage State 3 (inside & outside vehicle) |
|---|---|---|---|
| SP3T 202 | 3a | 1a | 2a |
| SPDT 204 | 1b or 2b | 1b | 2b |
| SPDT 206 | 2c | 1c or 2c | 1c |

To provide Wi-Fi coverage inside the vehicle 100 (Coverage State 1, which is the shown in FIG. 9), the pole P1 of SP3T switch 202 is coupled to contact 3a and the pole P3 of SPDT switch 206 is coupled to contact 2c. The pole P2 of SPDT switch 204 can be coupled to either contact 1b or contact 2b (or neither). For Coverage State 1, the router 112 is coupled to the first Wi-Fi antenna 116 via the position of each of the switches SP3T 202, SPDT 204, SPDT 206 shown in column one of Table 1 above.

To provide Wi-Fi coverage outside the vehicle 100 (Coverage State 2), the pole P1 of SP3T switch 202 is coupled to contact 1a and the pole P2 of SPDT switch 204 is coupled to contact 1b. The pole P3 of SPDT switch 206 can be coupled to either contact 1c or contact 2c (or neither). For Coverage State 2, the router 112 is coupled to the second Wi-Fi antenna 154 via the position of each of the switches SP3T 202, SPDT 204, SPDT 206 shown in column two of Table 1 above.

To provide Wi-Fi coverage to both inside and outside of the vehicle 100 (Coverage State 3), the pole P1 of SP3T switch 202 is coupled to contact 2a which engages the power divider 208. For Coverage State 3, the pole P2 of SPDT switch 204 is coupled to contact 2b and the pole P3 of SPDT switch 206 is coupled to contact 1c. For Coverage State 3, the router 112 is coupled to the first and second Wi-Fi antenna 116, 154 via the position of each of the switches SP3T 202, SPDT 204, SPDT 206 shown in column three of Table 1 above.

According to some embodiments, one or more sensors can be housed in one or both of the first housing 110 and the second housing 150. For example, one or more sensors can be included as components of the first electronics module 118 and/or the second electronics module 156. One or more sensors can be spaced from, but coupled to, the first electronics module 118 and/or the second electronics module 156. Such sensors can include, but are not limited to, an accelerometer, gyroscope, temperature sensor, a camera, a radar, and a lidar, for example.

Sensor data can be used to evaluate the operating condition of the communication system 101, 103, 105, 107. For example, a temperature sensor can be used to monitor the operating temperature of key components of the communication system 101, such as the router 112. An accelerometer or gyroscope can be used to monitor the physical forces acting on sensitive components of the communication system 101. Sensors such as a camera, radar, and lidar can provide meaningful data for assessing driver behavior and analyzing accidents. Sensor data can be communicated to the cloud and/or to smartphones/tablets within or proximate the vehicle 100 via the communication system 101, 103, 105, 107.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein. For example, and according to various embodiments, power and information signals can be transmitted through materials other than glass (e.g., plastic, woven fabrics, etc.).

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments." etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of." "comprises at least one of," and "one or more of" followed by a list refers to any one of the items in the list and any combination of two or more items in the list.

What is claimed is:

1. A communication system for a vehicle, comprising:
   a first housing configured to be mounted inside the vehicle;
   a router coupled to a first electronics module and an antenna selection module, the router, first electronics module, and antenna selection module disposed in the first housing;
   a first Wi-Fi antenna disposed in the first housing and coupled to the antenna selection module;
   a second housing configured to be mounted outside of the vehicle;
   a second Wi-Fi antenna disposed in the second housing and coupled to the antenna selection module;
   a modem disposed in the first housing or the second housing and coupled to the router; the antenna selection module comprising a tri-state switch operable by a user of the communication system for selecting between a plurality of Wi-Fi coverage states including an inside vehicle coverage state, an outside vehicle coverage state, and an inside and outside vehicle coverage state, wherein the tri-state switch arrangement comprises: a single pole-triple throw (SP3T) switch having a pole coupled to the router; a first single pole-double throw (SPDT) switch having a pole coupled to the first Wi-Fi antenna; a second SPDT switch having a pole coupled to the second Wi-Fi antenna; and
   a power divider selectively couplable between the SP3T switch and the first and second SPDT switches.

2. The system of claim 1, wherein the switch comprises a physical switch.

3. The system of claim 1, wherein the switch comprises a soft switch.

4. The system of claim 1, wherein the switch comprises a tri-state switch arrangement configured to selectively couple the router to the first Wi-Fi antenna, the second Wi-Fi antenna, or both the first and second Wi-Fi antennas.

5. The system of claim 1, wherein:
   the modem is disposed in the second housing; and
   a second electronics module is disposed in the second housing and coupled to the modem and the first electronics module.

6. The system of claim 1, wherein the modem is disposed in the first housing and coupled to the first electronics module.

7. The system of claim 1, wherein:

the second housing is configured to be mounted to a roof of the vehicle;

the first housing is configured to be mounted to a ceiling of the vehicle; and the first and second housings are mechanically connected via a coupling arrangement passing through the roof and ceiling.

8. The system of claim 7, wherein the coupling arrangement comprises a snap-on fastening arrangement.

9. The system of claim 1, wherein:

the first housing is configured to be mounted inside the vehicle and away from a ceiling of the vehicle; and the second Wi-Fi antenna is coupled to the antenna selection module by a cable passing through a hole in a roof of the vehicle and the ceiling.

10. The system of claim 9, wherein:

a second electronics module is disposed in the second housing; and the second electronics module is coupled to the first electronics module by a cable harness passing through a hole in the roof and the ceiling.

11. The system of claim 1, wherein one or both of the first electronics module disposed in the first housing and a second electronics module disposed in the second housing comprises one or more sensors.

12. The system of claim 11, wherein the one or more sensors comprise one or more of an accelerometer, a gyroscope, a temperature sensor, a camera, a radar, and a lidar.

13. The system of claim 1, comprising a connector interface configured to provide one or more of power, data, and RF connectivity between the first housing and the second housing.

14. The system of claim 1, wherein the router comprises or is coupled to a heatsink.

15. A communication system for a vehicle, comprising:

a first housing configured to be mounted to a ceiling of the vehicle; a router coupled to a first electronics module and an antenna selection module, the router, first electronics module, and antenna selection module disposed in the first housing;

a first Wi-Fi antenna disposed in the first housing and coupled to the antenna selection module;

a second housing configured to be mounted to a roof of the vehicle, wherein the first and second housings are mechanically connected via a coupling arrangement passing through the roof and ceiling;

a second Wi-Fi antenna disposed in the second housing and coupled to the antenna selection module;

a modem disposed in the first housing or the second housing and coupled to the router;

the antenna selection module comprising a tri-state switch operable by a user of the communication system, the switch comprising a tri-state switch arrangement configured to selectively couple the router to the first Wi-Fi antenna, the second Wi-Fi antenna, or both the first and second Wi-Fi antennas, wherein the tri-state switch arrangement comprises: a single pole-triple throw (SP3T) switch having a pole coupled to the router; a first single pole-double throw (SPDT) switch having a pole coupled to the first Wi-Fi antenna; a second SPDT switch having a pole coupled to the second Wi-Fi antenna; and a power divider selectively couplable between the SP3T switch and the first and second SPDT switches.

16. The system of claim 15, wherein the coupling arrangement comprises a snap-on fastening arrangement.

17. The system of claim 15, wherein the switch comprises a physical switch.

18. The system of claim 15, wherein the switch comprises a soft switch.

19. The system of claim 15, wherein the tri-state switch arrangement comprises:

a single pole-triple throw (SP3T) switch having a pole coupled to the router;

a first single pole-double throw (SPDT) switch having a pole coupled to the first Wi-Fi antenna;

a second SPDT switch having a pole coupled to the second Wi-Fi antenna; and a power divider selectively couplable between the SP3T switch and the first and second SPDT switches.

20. The system of claim 15, wherein:

the modem is disposed in the second housing; and a second electronics module is disposed in the second housing and coupled to the modem and the first electronics module.

21. The system of claim 15, wherein the modem is disposed in the first housing and coupled to the first electronics module.

* * * * *